June 25, 1968   M. L. A. TISSOT-DUPONT   3,389,886
PNEUMATIC PILOT VALVE WITH SNAP ACTION
Filed May 11, 1964

INVENTOR.
MICHEL LOUIS ANDRÉ
TISSOT-DUPONT
BY
Jacob Le Kollin

United States Patent Office 3,389,886
Patented June 25, 1968

3,389,886
PNEUMATIC PILOT VALVE WITH
SNAP ACTION
Michel Louis Andre Tissot-Dupont, Annecy, Haute-
Savoie, France, assignor to Société à R.L. named
S. T. Dupont, Paris, France
Filed May 11, 1964, Ser. No. 366,415
Claims priority, application France May 13, 1963
2 Claims. (Cl. 251—75)

The present invention concerns a pneumatic pilot valve having a precise and rapid opening, adapted in particular to control known pneumatic devices to be piloted by venting. The valve forming the subject of the invention presents, compared with known devices, numerous advantages among which are: sturdy construction, it requires no special sealing advantageous substiution of all the mechanical precision devices, simple manufacture, simplicity of manufacture, fairly low selling price, abrupt release opening, etc.

According to the present invention, the pneumatic valve comprises a piston valve, slidably guided, urged against an appropriate valve seat by a spring, with the interposition of a sliding pusher across the piston valve, the extremity of said pusher extending beyond the forward face of the said piston valve, and terminating at the end of an external control button and urged into an outward position by a spring seated against the forward face of the piston valve, this latter spring being weaker than the aforementioned spring urging the piston valve thus closing the valve in its rest position.

The valve is mounted by being screwed on the outlet connection of a known pneumatic device, the exhaust is then maintained closed as long as the valve is in the rest position by the difference of the thrust of the two springs on both sides of the piston valve and by the pressure of the compressed air urging the said piston valve against its seat.

The control of the valve is obtained by depressing the external control button. When the said button is first depressed, causing a slight compression of its spring, the end of the button comes into contact with the end of the intermediate pusher which is thus caused to slide in the piston valve, where it compresses the biasing spring. However, the piston valve, thus relieved of the pressure of its biasing spring, remains in abutment against the masking seat, in spite of the pressure exerted by the button spring thereon, due to the pressure of compressed air acting on this piston valve.

When the end of the button comes into contact against the piston valve at the end of the movement of the intermediate pusher across the said piston valve, this latter is mechanically withdrawn from the seat of the valve. As soon as the compressed air escapes by the passage between the seat and the piston valve, the pressure of compressed air in the chamber situated on the side of the piston valve falls, thus permitting a sudden recoil of said piston valve, the spring of which is compressed by the detent of the spring of the said control button. There is thus obtained the sudden and complete venting of the device during relatively short displacement of the external control button.

The control button of the valve could be actuated by any appropriate means: manual, mechanical, pneumatic etc., for example, by the sliding table of the machine at the end of the stroke or feed movement or even by a lever, arm, abutment etc. affixed or secured to movable parts of machines, apparatus or the like, the valve being disposed on a respective movable member or fixed to the said machines, apparatus or the like.

The invention will be described further, by way of example, with reference to the accompanying drawings, in which.

Figure 1:
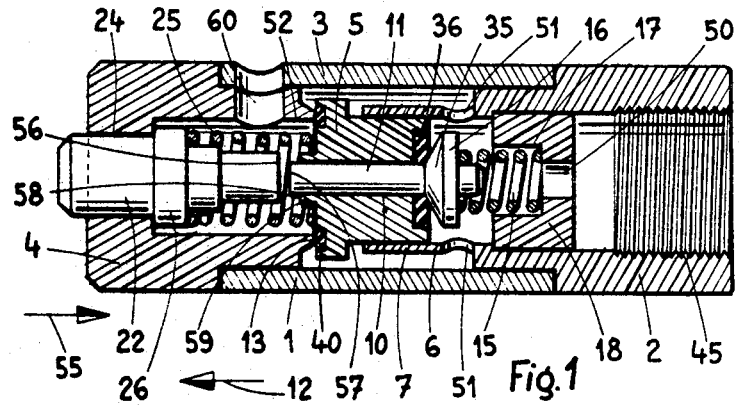
FIG. 1 is a longitudinal section of a pneumatic valve constructed in accordance with the invention, in the rest position.
Figure 2:
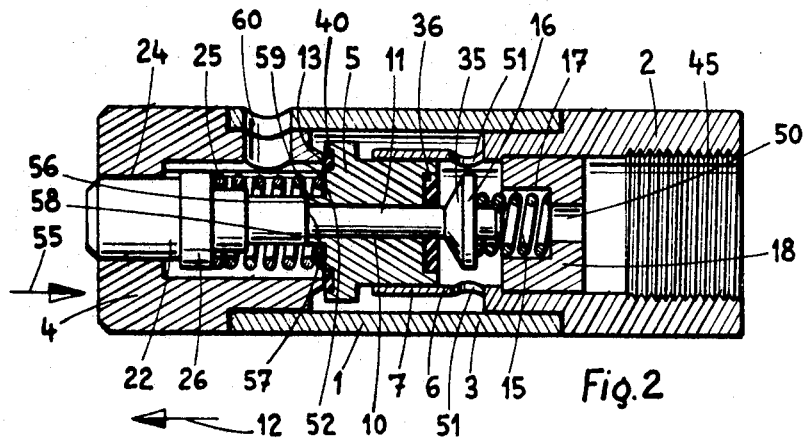
FIG. 2 is a longitudinal section of the pneumatic valve in accordance with FIG. 1 in the opening control position.
Figure 3:
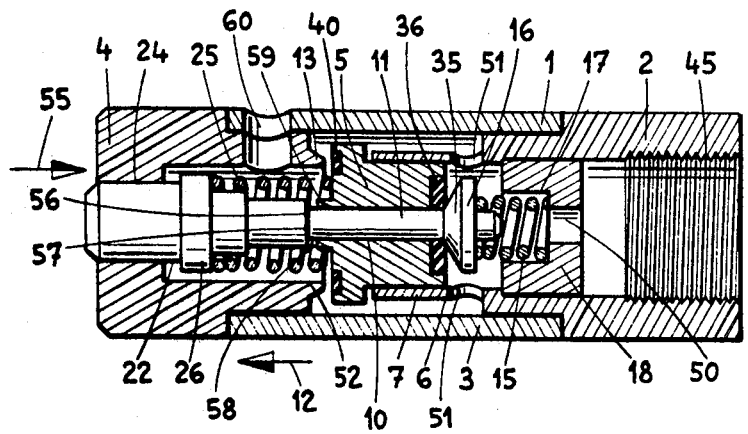
FIG. 3 is a longitudinal section of the pneumatic valve in accordance with FIG. 1 in the open position.

The valves shown in FIGS. 1 to 3 comprise a body 1 constituted by a ferrule 2, an intermediate cylinder 3, and a head 4 assembled by any appropriate means for example by swaging. A piston valve 5 is slidably guided longitudinally in the bore 6 of a bearing 7, having an external diameter smaller than that of the bore of the cylinder 3 of the ferrule 2. The piston valve 5, comprising a central bore 10 in which slides intermediate pusher 11, is urged into abutment in the direction 12, against an appropriate seat 13 of the head 4, through the intermediary of the pusher 11 by a spring 15 compressed between the appropriate head 16 of the said pusher 11, and the base of a section 17 of an abutment 18 secured to the ferrule 2. An external control button 22 sliding in the central bore 24 of the head 4 is urged, in the direction 12 into the outward position, by a spring 25 compressed between an appropriate bearing 26 of the said button 22 and the forward face of the piston valve 5.

In the rest position shown in FIG. 1, the spring 15 being weaker than the spring 25, the piston valve 5 is in contact with the seat 13 of the head 4 thus corresponding to the closed position of the valve which is the subject of the invention. To ensure a good fluid-tight sealing, the intermediate pusher 11 comprises a conical bearing 35 coming into contact with a joint 36 mounted in the appropriate section of the piston valve 5, and carried by this latter against the seat 13 of the head 4, being rendered fluid-tight by the aid of a joint 40 disposed, by example connected in a circular throat of the said piston valve 5.

The valve shown in FIGS. 1 to 3, being mounted by screwing by means of the threaded orifice 45 of the ferrule 2 on the exhaust of any pneumatic device to be piloted by venting, the piston valve 5 is maintained in contact against the seat 13 of the head 4 on the one hand by the action of the spring 15 and on the other hand by the pressure of air or compressed fluid of exhaust of the pneumatic device. The compressed air or fluid penetrating to the inside of the valve by passage across a central orifice 50 of the abutment 18 and the appropriate orifices 51 of the bearings 7 of the ferrule 2, its application pressure of the piston valve 5 on the seat 13 sensibly corresponds to the pressure exerted on the surface equivalent to that of the piston valve 5, corresponding to the bore 52 of the seat 13 of the head 4. The valve is then closed energetically thus avoiding any escape of air or compressed air or fluid. (FIG. 1.)

The control of the opening of the valve is obtained by pressing the button 22 in the direction 55 into the interior of the said valve.

When the button 22 is first pressed in the direction 55, the spring 25 is compressed, but, being too weak, is unable to withdraw the piston valve 5 from the seat 13 of the head 4; then the button 22, through the intermediary of its end 56 comes into contact against the end 57 of the intermediate pusher 11 which it drives in the direction 55 up to the level of the front face 58 of an appropriate bearing 59 made on the face of the piston-valve 5 in abutment against the seat 13, as shown in FIG. 2. The displacement of the pusher 11 in the direction 55 has the effect of compressing the spring 15 through the intermediary of the head 16, and thus relieves the piston valve 5 of the biasing action of the said spring 15, in the direction 12, the piston valve 5 now only remaining against the seat 13 by the single effect of the compressed air of fluid.

On being pressed a second time, as soon as the button 22, continuing to be moved in the direction 55 passes the position shown in FIG. 2 for a small displacement of the said button 22, the end 57 of this latter operating on the face 58 of the bearing 59 of the piston valve 5 starts to withdraw the said piston valve 5 from the seat 13 of the head 4 of the body of the valve; immediately, the compressed air or fluid in the valve escapes by the open space between the said piston valve and seat 13 and by an appropriate venting hole 60, entrains the drop of pressure of air of fluid from the chamber composed between the threaded orifice 45 and the application plane of the piston valve 5 against the seat 13 and thus permits the piston 5 to recoil almost instantaneously in the direction 55 subject to the action of the spring 25, the spring 15 remaining (compressed by the button 22), until the said piston valve 5 abuts against the conical bearing 35 of the pusher 11. The valve is thus suddenly put into a completely open position for a short displacement and a predetermined position of the course of the button 22, thus piloting the pneumatic device which it equips. Remarkably robust and of easy construction the valve which is the subject of the invention permits the obtaining a rapidity, and a precision of opening which is of particular interest; on the other hand it has a really small size, being screwed by the intermediary of its threaded orifice 45 on the venting duct of any pneumatic device or similar, and it does not necessitate any special protective seal on the contrary for example existing devices of the same adaptation comprising electric contacts.

The control of the depression of the button 22 of the valve could be effected manually or by any appropriate means, for example mechanical. The valve could be disposed, fixed with respect to any moveable member (sliding cable, movable pulley, etc.) of a machine apparatus or similar, coming to depress the button 22 and controlling the piloting of the pneumatic device to which the valve is connected provoking for example the recoil of the movable member.

There would be no departure from the scope of the invention whatever the number, the form, the dimensions, the disposition and the proportions of the different constituent parts of the valve, and whatever the means of control of the button.

Similarly, the different constituent parts of the valve which is the subject of the invention could be made in any materials and/or combinations of materials could present any aspect submitted to any treatment; physical, chemical etc. with a view to example for their protection against use, wear or corrosion and the valve could be adapted to any use without departing to this from the scope of the invention.

I claim:
1. A pneumatic valve comprising a cylindrical valve body having an open threaded end and a closed end, a cylindrical bearing mounted axially of said valve body and having an outer diameter smaller than the inner diameter of said body and forming a chamber therebetween, a piston valve slidable in said bearing and having an axial bore, an intermediate pusher slidable in said piston valve and having a head portion and a bearing portion, an abutment provided with an axial bore, secured in said open end of the valve body, a first helical spring mounted between said abutment and said pusher head portion for biasing said cylindrical valve against said valve body closed end, a control button for displacing said pusher against the bias of said first spring, extending through said closed end, a second helical spring interposed between said piston valve and said control button, said second spring being stronger than said first spring, said bearing having a passage communicating with said valve body open end, said valve body having a bore in its wall adjacent its closed end, for equalizing the pressure exerted upon said valve.

2. The pneumatic valve according to claim 1, wherein said head portion of the pusher is frusto-conical, the adjacent end of said piston valve being provided with sealing means, the opposite end of said piston valve having a circular recessed portion likewise provided with sealing means for sealing engagement of said opposite end with said closed end.

References Cited
UNITED STATES PATENTS

| | | | |
|---|---|---|---|
| 616,197 | 12/1898 | Moller | 137—630 |
| 828,374 | 8/1906 | Blein | 137—630.15 |
| 1,132,570 | 3/1915 | Fivey | 137—630.15 |
| 2,213,488 | 9/1940 | Dowrick | 137—630.15 |
| 2,508,064 | 5/1950 | Hazard | 137—630.15 X |
| 3,048,194 | 8/1962 | Huthsing | 137—630.15 |

FOREIGN PATENTS 877,624   9/1961   Great Britain.

CLARENCE R. GORDON, *Primary Examiner.*